No. 839,626. PATENTED DEC. 25, 1906.
C. NIELSEN.
DEVICE FOR INFLATING THE PNEUMATIC TIRES OF VEHICLES.
APPLICATION FILED DEC. 14, 1905.
2 SHEETS—SHEET 1.
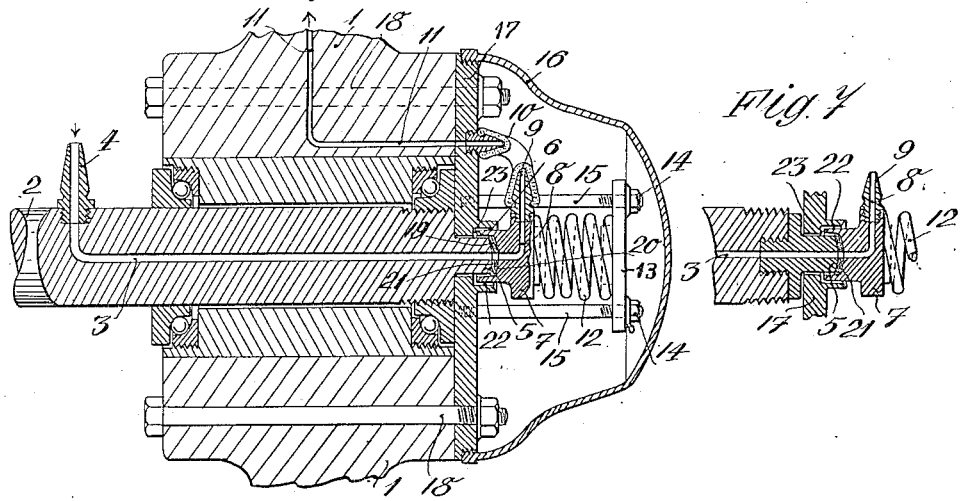
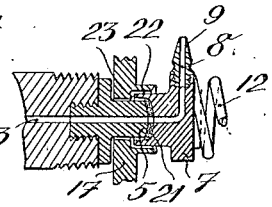
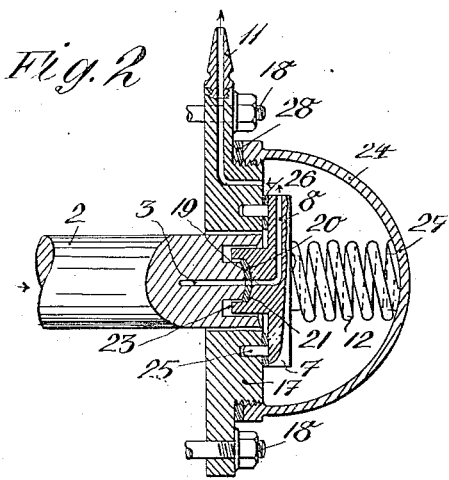
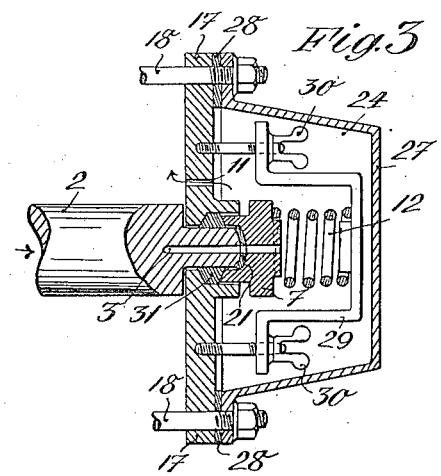
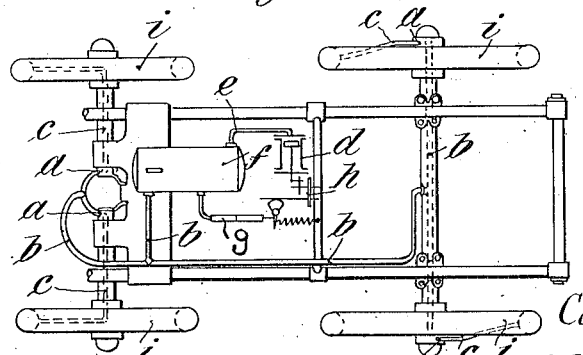
Witnesses
Inventor
Carl Nielsen

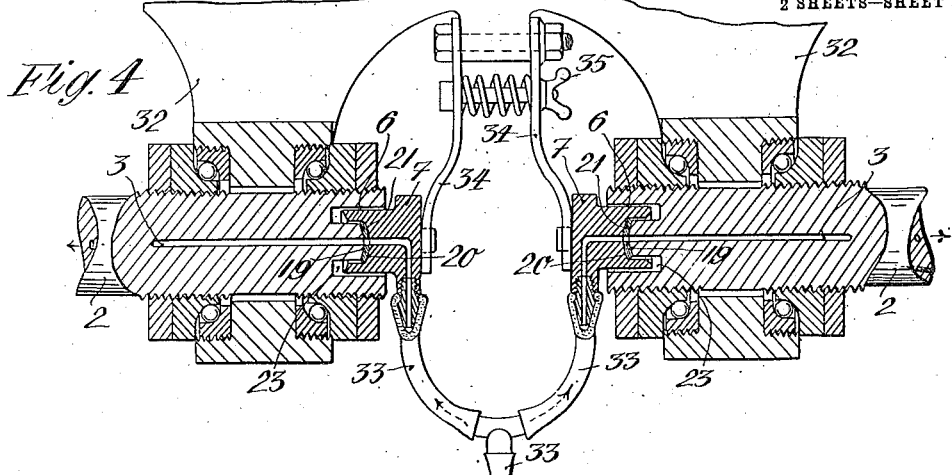
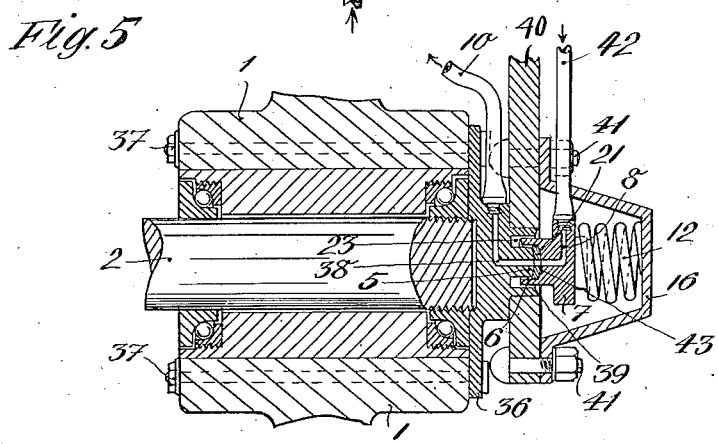
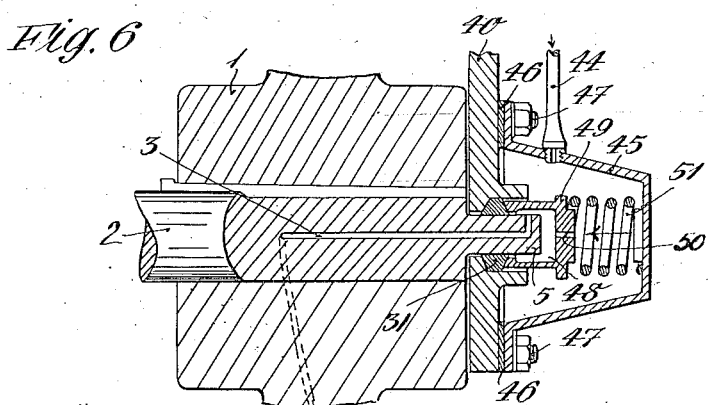

UNITED STATES PATENT OFFICE.

CARL NIELSEN, OF COPENHAGEN, DENMARK.

DEVICE FOR INFLATING THE PNEUMATIC TIRES OF VEHICLES.

No. 839,626.     Specification of Letters Patent.     Patented Dec. 25, 1906.

Application filed December 14, 1905. Serial No. 291,755.

*To all whom it may concern:*

Be it known that I, CARL NIELSEN, manufacturer, residing at Copenhagen, Oerstedsvey 20, in the Kingdom of Denmark, have invented an Improved Device for Inflating the Pneumatic Tires of Vehicles, of which the following is a specification.

This invention relates to a device for inflating the pneumatic tires of vehicles in which in order to enable the inflation to be effected while traveling the pneumatic tires are connected with an air-pump arranged on the vehicle by means of an air-pipe consisting of fixed and movable parts. The fixed parts of the air-pipe are rigidly connected with the frame of the vehicle, while the movable parts adjoin the pneumatic tires, so that while the vehicle is moving they execute a rotary motion around the axes of the wheels. In such devices the packing between the fixed and the movable parts of the air-pipe presents great difficulties. It has not been found possible hitherto to effect this packing in such a manner that air could pass out of the fixed into the movable parts of the air-pipe or inversely without a considerable escape of air.

By means of the new device which forms the subject of the present invention it is possible for the compressed air to be reliably conveyed without any escape. For this purpose the positions for effecting coupling between the fixed and movable parts of the air-pipe are provided in certain definite parts of the vehicle. The important point is that each coupling-place should be situated on the ends of the wheel-axles. In this way it is possible to arrange the opening of the one part of the pipe in such a manner that its central point lies in the axis of the wheel, so that the other part of the pipe can be joined up, so as to form a direct extension of the first part. In this way it is possible to restrict the packing-surfaces to the smallest possible dimensions, as their size is dependent only upon the bare width of the parts of the air-pipe. By polishing the rounded packing-surfaces it is possible to obtain so small a friction that the wheels can run with the greatest rapidity without becoming hot and that they can endure the strongest shocks. Further, the wear and tear of the packings is very small, and they are tightened automatically while wearing and may be renewed easily from abroad.

In Figures 1 to 6 of the accompanying drawings the invention is illustrated in several forms by vertical sections at a coupling-point between a fixed and a movable part of the air-pipe. Fig. 7 shows the varied form of a detail employed in the invention. Fig. 8 is a diagrammatic plan of the frame of a motor-car with the coupling-places arranged according to the present invention. Fig. 9 is a diagram illustrating the manner in which the form of the curvature on the end surfaces of the wheel-axles is determined.

In the form of the invention according to Fig. 1, the wheel 1 is loosely seated on the axle 2, so that the axle represents a fixed part. The axle 2 is provided with a passage 3 for conducting the air, into which the air is conveyed by attaching a hose-pipe or the like to the junction 4. On the end of the axle 2 a pin-like extension 5 is arranged, which engages with the cylindrical bore 6 of a sleeve-like part 7. This sleeve-like part 7 has a passage 8, to which the pipe 11, which leads to the pneumatic tire of the wheel, is connected by means of a junction-piece 9 and a hose-pipe piece 10. The sleeve-like part 7 is under the influence of a spring 12, which lies against a cross-piece 13, which after the placing of the nuts 14 on the bolts 15 can be adjusted in such a manner that the pressure of the spring can be regulated. The described parts are inclosed by a cap or casing 16, which is screwed to a plate, disk, or the like 17. By means of bolts 18 this disk, plate, or the like 17 is connected with the wheel 1 and rotates therewith. It will be seen that in this form of the invention the fixed part of the air-pipe is formed by the wheel-axle 2 and the movable part of the air-pipe by the parts 7, 9, 10, and 11. The object now is to effect an air-tight packing between these parts—that is to say, at the place where the air passes out of the passage 8 in the sleeve-like part 7 into the passage 3 in the axle 2. For this purpose packing material 21 is provided between the end 19 of the axle 2 and the bottom 20 of the cylindrical boring 6 in the sleeve-like part 7. It will be observed that the packing-surfaces 19 and 20 may be made very small, because the passages 8 and 3 pass directly one into the other and because the central point of the opening of the passage 8, lying against the axle 2, is situated in the axis of the wheel 1 or in the central line of the wheel-axle 2. The surfaces 19 and 20, as will be seen, are suitably curved spherically in order that permeability may be avoided when the vehicle is shaken or when the contact-surfaces of the hub and the axle are worn. In order that independent movements of the parts of the pipe in the vertical direction may be possible, the pin-like extension 5 of the axle 2 has "play" in the cylindrical passage 6 of the sleeve 7 and the latter has play in a cylindrical hub 22 in the plate 17. In the annular space 23, which is limited, on the one hand, by the plate 17 and, on the other hand, by the sleeve 7, lubricating material or the like can be introduced. It is not necessary that the pin-like extension 5 of the axle 2 should form a part of the axle. It may, as shown in Fig. 7, be specially arranged on the axle by being screwed thereto.

In the form of the invention shown in Fig. 2 a special device is shown, the object of which is that when the pressure of the spring 12 is adjusted the pressure existing in the interior of the air-pipe, which in most cases is very great, may not be overcome. In this device there is no direct connection between the pipe 11, which conveys the compressed air to the pneumatic tire, and the passage 8 in the sleeve-like part 7; but the connection between these parts is formed by a chamber 24, which is impermeably closed on the outside and screwed to the plate, disk, or the like 17. The sleeve-like part 7 is thus internally as well as externally under the pressure of the compressed air, so that equilibrium is completely established. By means of the spring 12 it is only necessary to apply such a pressure as is requisite for making the surfaces 19 and 20 come tightly together. For the guiding of the sleeve-like part 7 pins 25 are provided, which enter suitable openings in the plate 17. In order to prevent air from passing out between the disk 17 and the axle, a packing-ring 26 of any preferred material is placed between the disk 17 and the sleeve 7. For the purpose of rendering the chamber 24 air-tight a layer of packing 28 may be provided under the flange of the cap 27. It will be seen that in this form of the invention also the coupling-place between the movable part 7 and the fixed part 2 of the air-pipe lies at the end of the axle 2, and the packing between these parts of the pipe is restricted to the least possible dimensions.

The form of the invention according to Fig. 3 is carried out in a similar manner as that in Fig. 2. The adjustment of the pressing-spring 12 is effected in this case not by the adjustment of the closing-cap 27 of the chamber 24, but by a special bent piece 29, which can be moved by means of winged nuts 30. In this form of the invention, moreover, a layer of packing 31 is provided, which is laid round the pin 5 of the axle 2.

Fig. 4 shows that it is not necessary that the coupling-places between the fixed and the movable parts should be situated at the outer ends of the wheel-axles, as the coupling-places may, as shown, be situated on the inner ends of the axles. This form is particularly suitable in connection with the front-wheel axle, which is generally divided. 32 represents bearings arranged on the carriage-frame and in which the axles 2 are pivoted. On the axles 2 the running-wheels (not shown) are firmly mounted, the pneumatic tires of these wheels being in connection with the passages 3 in the axle 2. Thus in this form of the invention the axle 2, with its passage 5 for conveying the air, forms a movable part of the air-conduit. The fixed part of the air-conduit is formed by the hose-pipe 33, leading to the air-pump, and the sleeves 7, which can rotate on the inner ends of the axles 2. Substantially the special form of this device agrees with the form illustrated in Fig. 1. For pressing the sleeves 7 against the ends of the axles in this case, however, flat springs 34 are employed, one end of the spring being fixed to the carriage-frame and the other and free end pressing against the sleeve 7. For adjusting the pressure of the springs 34 a winged nut 35 is employed, which passes through both flat springs 34. In this form of the invention, as in that previously described, the packing-surface between the movable part 2 of the air-conduit and the fixed part 7 is reduced to the smallest dimensions, as these two parts come against one another by their ends.

By the form illustrated in Fig. 5 it is shown that it is not necessary to employ the axle as an air-conduit. In such a case the hose-pipe 10, through which the compressed air is conveyed to the pneumatic tire, may join onto a special coupling-piece 36, which is rigidly connected with the wheel 1 by screws 37 or in other equivalent way in such a manner that it participates in the rotation of the wheel and that thereby its passage 36 forms a part of the movable part of the air-conduit. The coupling part 36 may be seated by its end 39 in a bearing 40, rigidly connected with the carriage-frame. This bearing 40 can then also serve for fixing the cap 16, which, for example, is effected by screws 41 or in any other manner. In this cap 16 the part 7, furnished with the passage 8, is then arranged. The part 7 is under the influence of the spring 12 and has the pipe 42 attached to it, which is joined up to the air-pump. It will thus be seen that it is also possible without employing the axle to arrange the coupling-points between the fixed parts 42 7 and the movable parts 36 10 of the air-conduit on the end of the axle. In this case also the packing between the surfaces rotating against each other can be reduced to the smallest possible dimensions, as the middle point of the opening 43, through which the compressed air passes into the movable part, lies in the axis of the movable part. Here also the packing material 21 is provided between the end of a pin-like extension 5 and the bottom of a cylindrical opening 6. In this form of the invention also the annular space 23 may be employed for receiving lubricating material.

In the form illustrated in Fig. 6 the wheel 1 is firmly keyed to the axle 2, so that in this case also the axle 2, with its passage 3, forms a movable part of the air-conduit. The pipe 44, leading to the pneumatic wheel-tire, opens in this case into a chamber 45, which is made air-tight on the outside and is fixed on a bearing provided in the frame 40 of the vehicle by means of screws 47 or the like, with an intermediate layer of packing 46. The passage 3 in the axle runs into the hollow space 48 in a sleeve 49, in which a passage 50 is provided, through which the compressed air can pass out of the hollow space in the chamber 45 by means of the hollow space 48 into the passage 3 of the axle 2 and thence into the air-conduit. The sleeve 49 is under the influence of a spring 51, by which it is pressed toward the end of the axle 2. The layer of packing 31 is in this case, as in the form according to Fig. 3, laid round the external surface of the pin-like extension 5 of the axle 2. In this form, moreover, as in the forms shown in Figs. 2 and 3, only a relatively small expenditure of power is necessary for tightening the packing 31—that is, for adjusting the sleeve 49—as in consequence of its being arranged in a space which is under the pressure of the compressed air the sleeve 49 is entirely in equilibrium.

In the diagrammatic plan of a vehicle-frame illustrated in Fig. 8, *a* represents the coupling-points between the fixed parts *b* and the movable parts *c* of the air-conduit. *d* is the air-pump, which is connected by a pipe *e* with an air vessel *f*, to which a device *g* is joined, by means of which the air-pump *i* is set in action automatically through the medium of the device *h* when the pressure in the pneumatic tires *i* falls—that is to say, when there is a reduction of pressure in the air vessel *f*. The pump *d* is put out of action immediately the pressure in the tires is as great as desired. For this purpose a device may be employed similar to that claimed and described in United States Patent No. 722,656. This automatic starting and stopping of the air-pump can of course be dispensed with. In the drawings the arrows indicate the direction in which the compressed air flows through the conduit.

The object of the invention, as will be seen from the foregoing, is of course independent of the special form of its different parts. The connection between the fixed and the movable parts of the air-conduit may be effected alike with the assistance of other constructional parts and with the employment of intermediate parts constructed as may be desired. It is only necessary that the coupling-places should be situated on a positively-determined part of the vehicle—viz., at one end of the axle. In connection herewith it is a matter of indifference whether they are situated at an end which is outside the wheels or one that is between the wheels. The principle underlying the present invention can, moreover, be applied to other purposes when it is necessary to produce an air-tight coupling between a fixed and a rotary part with surfaces as small as possible moving one against the other.

What I claim as my invention, and desire to secure by Letters Patent, is—

1. A device for inflating pneumatic tires of vehicles with coupling parts situated at the end of the axle for connecting the fixed and movable parts of the air-conduit, a packing arranged between the meeting faces of both parts, and springs for pressing both parts of the air-conduit against each other and the packing between them.

2. In a device for inflating the pneumatic tires of vehicles coupling parts at the end of the axle in alinement with one another, a layer of packing placed between their meeting ends and a spring for pressing one of the parts and the packing against the other part.

3. In a device for inflating the pneumatic tires of vehicles coupling parts at the end of the axle in alinement with one another, one of the parts being provided with a pin-like extension and the other with a cylindrical passage, a layer of packing being placed between their meeting ends and adjustable springs for pressing both parts against each other and for compressing the packing layer between them.

4. In a device for inflating the pneumatic tires of vehicles coupling parts at the end of the axle telescoping with one another, one of the parts being provided with a pin-like extension and the other with a cylindrical passage, both parts working loose against each other in the vertical direction, a layer of packing between their meeting ends and a spring for pressing them and the packing together at the coupling-places.

5. In a device for inflating the pneumatic tires of vehicles, a special coupling part arranged in front of the end of the axle for leading the air from the fixed to the movable parts of the air-conduit, a spring pressing against this coupling part, one part of the air-conduit being rigidly connected with this coupling part, the other part of the air-conduit being rotatively seated against it.

6. In a device for inflating the pneumatic tires of vehicles, a chamber closed air-tight against the outside being arranged at the end of the axle of the wheel, one part of the air-conduit branching off from this chamber, a coupling part being arranged in it, a spring in the chamber pressing against the coupling parts, a packing layer between the coupling parts, the spring-actuated coupling part being eased by the air-pressure of the chamber.

7. In a device for inflating the pneumatic tires of vehicles, coupling parts pressed together by springs at the ends of the wheel-axles, one of them being fixed and the other being movable, the surfaces of both parts being curved in spherical form and a packing between their meeting ends.

8. In a device for inflating the pneumatic tires, an automatic air-pump, driven from the source of power, an automatic device, actuated by the air-pressure, for connecting and disconnecting the pump with a source of power, an air-conduit for leading the air to the tires, coupling parts between the fixed and the movable parts of the conduit, situated at the ends of the axles and pressed against each other by springs.

9. In an air-conduit the combination of a coupling device arranged at the end of an axle and comprising a fixed member, a movable member disposed in alinement therewith, a packing arranged between the meeting ends of said members, and spring means for pressing said fixed and movable members together to tighten the packing.

10. In an air-conduit the combination of a coupling device arranged at the end of an axle and comprising a fixed member, a movable member disposed in alinement therewith, a packing arranged between the meeting ends of said members, and spring means for pressing said fixed and movable members in the direction of their length to tighten the packing between them.

In witness whereof I subscribe my signature in presence of two witnesses.

CARL NIELSEN.

Witnesses:
  WOLDEMAR HAUPT,
  HENRY HASPER.